W. H. ABBOTT.
SPRING WHEEL.
APPLICATION FILED OCT. 11, 1913.
1,104,752.  Patented July 21, 1914.
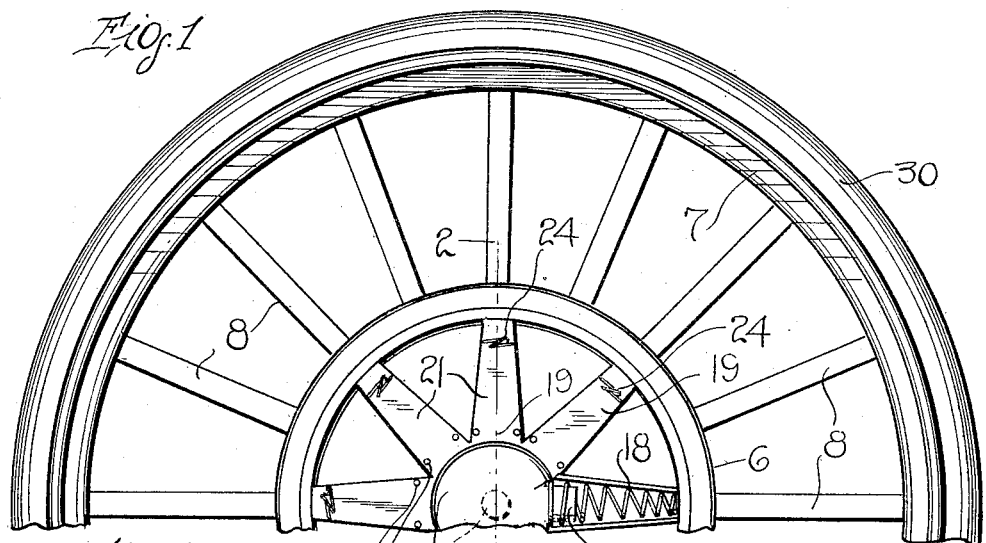
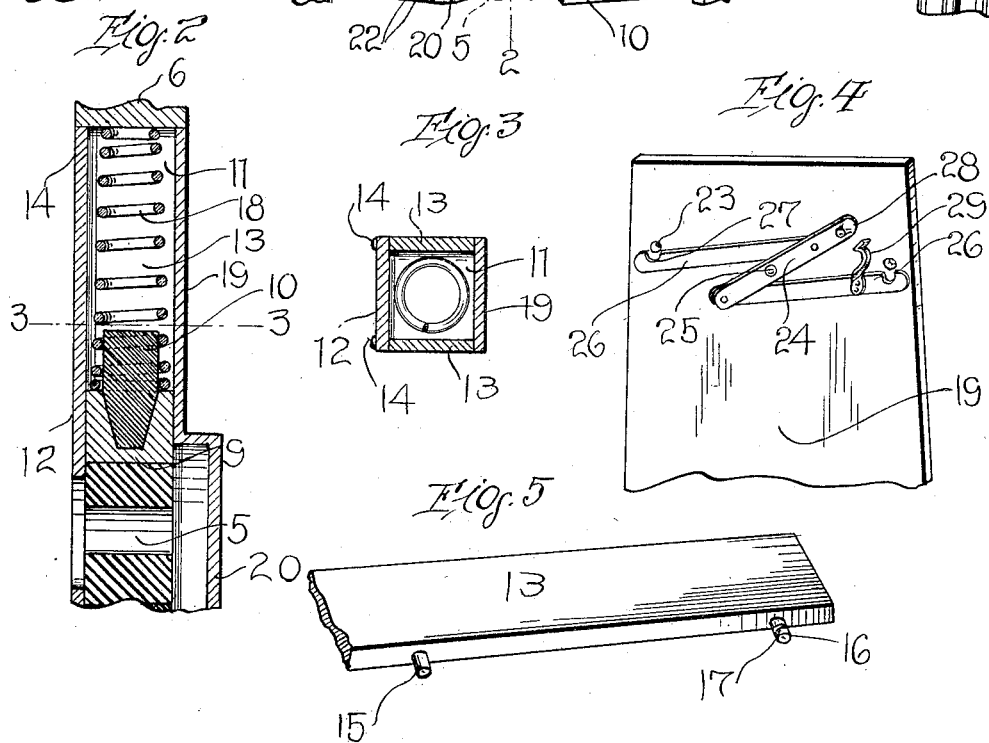
Witnesses
Robert M. Sutphen
V. J. Dowrick
Inventor
W. H. Abbott
By Watson E. Coleman
Attorney

UNITED STATES PATENT OFFICE.

WILLIAM H. ABBOTT, OF GWINN, MICHIGAN.

SPRING-WHEEL.

1,104,752.  Specification of Letters Patent.  Patented July 21, 1914.

Application filed October 11, 1913. Serial No. 794,703.

*To all whom it may concern:*

Be it known that I, WILLIAM H. ABBOTT, citizen of the United States, residing at Gwinn, in the county of Marquette and State of Michigan, have invented certain new and useful Improvements in Spring-Wheels, of which the following is a specification, reference being had to the accompanying drawings.

This invention relates to improvements in spring wheels and has for its principal object to provide a highly efficient and serviceable wheel particularly designed for use upon motor vehicles whereby the ordinary pneumatic tire may be dispensed with.

The invention has for another and more specific object the provision of a wheel embodying a plurality of radially disposed casings open upon one side, pins mounted upon the wheel hub extending into the inner ends of said casings, springs arranged upon said pins and disposed within the casings, and a removable cover plate for the open side of said casings.

My invention has for another object to provide a spring casing of improved construction, a removable cover plate for one side of said casing, and means for removably locking said cover plate in position.

My invention has for still another object to generally improve and simplify the construction of spring wheels, and to produce a device which is extremely durable in actual use and may be manufactured at comparatively small cost.

With the above and other objects in view as will become apparent as the description proceeds, the invention consists in certain construction, combinations and arrangements of the parts that I shall hereinafter fully describe and claim.

For a full understanding of the invention, reference is to be had to the following description and accompanying drawings, in which—

Figure 1 is a partial side elevation of a spring wheel embodying my invention in its preferred form, a portion of the cover plate for the spring casings being broken away; Fig. 2 is a section taken on the line 2—2 of Fig. 1; Fig. 3 is a section taken on the line 3—3 of Fig. 2; Fig. 4 is a detail perspective view of one of the casing plates; Fig. 5 is an enlarged perspective view of the locking device for the cover plate of the casing.

Referring in detail to the drawings, 5 designates the wheel hub which is mounted upon the axle spindle of the vehicle in any approved manner.

The wheel proper includes an inner rim 6 and an outer rim 7 which are connected by means of a plurality of radially disposed spokes 8.

9 indicates an annulus in which a plurality of radially extending pins 10 are secured in any preferred manner. These pins extend into the inner ends of the radial casings 11 the outer ends of which are secured in the inner rim member 6. Each of the casings 11 includes a body plate 12. If desired, the body plates 12 of the series of casings may be formed from one piece of metal, or the same can be secured together at their inner ends.

13 designates the side plates of each casing which are secured to opposite edges of the body plate 12 by suitable rivets 14. To the other or outer edges of the side plates 13, adjacent their inner ends, pins 15 are fixed. Contiguous to the outer end of each of the side plates, an additional pin 16 is secured, said latter pins being slightly longer than the inner pins 15 and provided with notches 17. The particular purpose of these pins which are mounted upon the side plates will be later referred to.

Each of the casings 11 is adapted to receive a coil spring 18, the inner ends of which receive the pins 10 and bear upon the annulus 9. The outer ends of these springs engage the inner wheel rim 6. The springs 18 normally act to maintain the wheel proper in concentric relation to the hub 5.

An outer face plate 19 for the series of spring casings 11 is formed from a single sheet of metal and includes a central cylindrical portion 20 which accommodates the outer end of the hub 5 and the radially disposed arms 21 which conform in shape to the shape of the casings 11. These arms are provided in their edges with openings 22 and 23 respectively, to accommodate the pins 15 and 16 upon the side plates of the spring casings. Upon the outer end of each arm 21 of the cover plate, a locking device is mounted. This locking device includes a lever 24 which is pivoted intermediate of its ends as at 25 upon the arm 21. Upon opposite sides of the pivot 25, the oppositely extending locking plates 26 are pivotally attached. The outer end of each of these plates is provided in its upper edge with a notch 27, and these notches are adapted to receive the outer ends of the pins 16, the notches 17 of said pins receiving the lower edges of the notches 27 in the locking plates. One end of the lever 24 is provided with a lug 28 which is adapted to be engaged by a spring catch plate 29 mounted upon one of the locking plates 26. From this construction, it will be apparent that when the cover plate is arranged in position over the spring casings 11, it is simply necessary to force the levers 24 downwardly to move the locking plates 26 inwardly toward each other into locking engagement with the pins 16. The other pins 15 on the side plates of the casings extend through the inner openings 22 in the arms of the cover plate and are flush with the outer face of said plate.

Upon the outer rim 7 of the wheel, a solid rubber or metal tire 30 is secured.

From the above description, it is believed that the construction and manner of operation of the invention will be clearly and fully understood. It will be seen that the series of springs 18 yieldably support the wheel proper for movement with relation to the hub 5 so that all shocks or jars will be absorbed by said springs and not transmitted to the body of the vehicle. My improved wheel structure is also extremely durable and serviceable in actual use. The cover plate 19 may be very easily and quickly removed should any one of the springs 18 be broken, and said spring replaced by a new one. The locking devices on the arms of the cover plate will securely retain said plate in position.

It will further be understood that my invention is susceptible of a great many modifications in the form, proportion and arrangement of the several elements and I therefore reserve the right to resort to all such legitimate changes as may be fairly embodied within the spirit and scope of the invention, as claimed.

Having thus described the invention, what is claimed is:

1. The combination with a spring wheel including a plurality of cushioning springs, of a casing for each of said springs, said casings being open upon one side, pins secured to the side walls of each casing, a cover plate embodying a plurality of arms adapted for engagement upon the open sides of the respective casings and provided with openings to receive said pins, and a pair of locking members movably mounted upon each of said arms for engagement with said pins to removably lock the cover plate to the spring casings.

2. The combination with a spring wheel including a plurality of cushioning springs, of a casing for each of said springs open upon one side, pins projecting from each of the side walls of the casing at its open side, a cover plate embodying a plurality of arms, said arms being adapted for engagement over the open sides of the respective spring casings, and provided with openings to receive the pins thereon, and locking devices mounted upon the outer ends of said arms, each including a pair of movable locking elements and a lever to actuate the same, said elements being adapted to engage the pins upon the casing walls and removably lock the cover plate in position thereon.

In testimony whereof I hereunto affix my signature in the presence of two witnesses.

WILLIAM H. ABBOTT.

Witnesses:
GEORGE BARRY,
JOHN FRANCIS.

---

Copies of this patent may be obtained for five cents each, by addressing the "Commissioner of Patents, Washington, D. C."